(12) United States Patent  (10) Patent No.: US 8,109,386 B2
Krohn  (45) Date of Patent: Feb. 7, 2012

(54) FASTENING CLIP BAR

(75) Inventor: Burghardt Krohn, Ammersbek (DE)

(73) Assignee: Joh. Friedrich Behrens AG, Ahrensburg (DE)

( * ) Notice: Subject to any disclaimer, the term of this patent is extended or adjusted under 35 U.S.C. 154(b) by 0 days.

(21) Appl. No.: 12/342,645

(22) Filed: Dec. 23, 2008

(65) Prior Publication Data
US 2010/0077572 A1 Apr. 1, 2010

(30) Foreign Application Priority Data
Sep. 26, 2008 (DE) .......... 10 2008 050 583

(51) Int. Cl.
B65D 85/24 (2006.01)
(52) U.S. Cl. ........................ 206/345; 206/343
(58) Field of Classification Search .................. 206/338, 206/340, 343, 345; 411/457, 920, 476, 921, 411/443
See application file for complete search history.

(56) References Cited

U.S. PATENT DOCUMENTS

| 1,026,050 | A | * | 5/1912 | Reber | 206/340 |
| 1,557,121 | A | * | 10/1925 | Vogel | 206/340 |
| 1,792,235 | A | * | 2/1931 | Maynard | 206/340 |
| 2,021,274 | A | * | 11/1935 | Vogel | 411/443 |
| 2,056,180 | A | * | 10/1936 | Flood | 24/23 W |
| 2,526,902 | A | | 10/1950 | Rublee | |
| 2,862,612 | A | * | 12/1958 | Brown | 206/340 |
| 2,985,295 | A | * | 5/1961 | Erdmann | 206/345 |
| 3,038,596 | A | * | 6/1962 | Anstett | 206/340 |
| 3,613,878 | A | * | 10/1971 | Langas et al. | 206/340 |
| 3,788,187 | A | | 1/1974 | Knohl | |
| D231,902 | S | | 6/1974 | Olson | |
| 3,813,985 | A | | 6/1974 | Perkins | |
| 4,275,813 | A | | 6/1981 | Noiles | |
| 4,664,733 | A | | 5/1987 | Masago | |
| 4,791,014 | A | | 12/1988 | West | |
| 5,360,305 | A | | 11/1994 | Kerrigan | |
| 5,441,373 | A | | 8/1995 | Kish | |
| 5,615,985 | A | | 4/1997 | Rose et al. | |
| 5,620,289 | A | | 4/1997 | Curry | |
| 5,795,121 | A | | 8/1998 | Tucker et al. | |
| D402,540 | S | | 12/1998 | Stridh | |
| 6,086,304 | A | * | 7/2000 | Hujishima et al. | 411/443 |
| 7,104,741 | B2 | * | 9/2006 | Krohn | 411/457 |
| 2003/0143059 | A1 | | 7/2003 | Krohn | |

FOREIGN PATENT DOCUMENTS

| GB | 985 012 A | 3/1965 |
| GB | 1 116 244 A | 6/1968 |
| GB | 1 453 640 A | 10/1976 |

* cited by examiner

Primary Examiner — David Fidei
(74) Attorney, Agent, or Firm — Vidas, Arrett & Steinkraus, P.A.

(57) ABSTRACT

A fastening clip bar, comprising a plurality of fastening clips arranged parallel to each other, an adhesive joining the fastening clips with each other, and at least one elastic tape extending over the fastening clips which is glued together with the same.

21 Claims, 1 Drawing Sheet

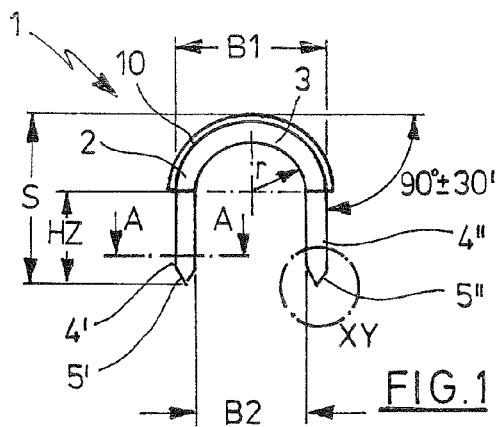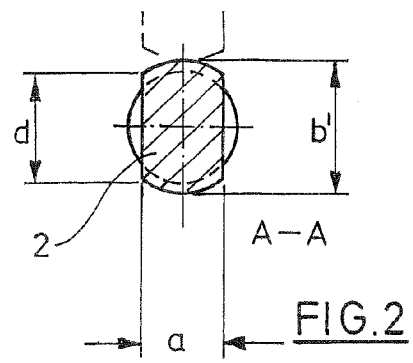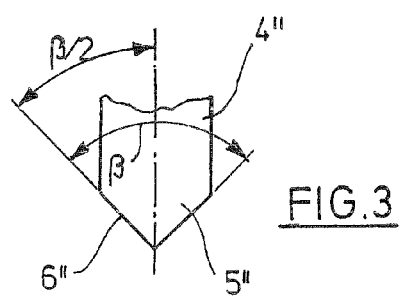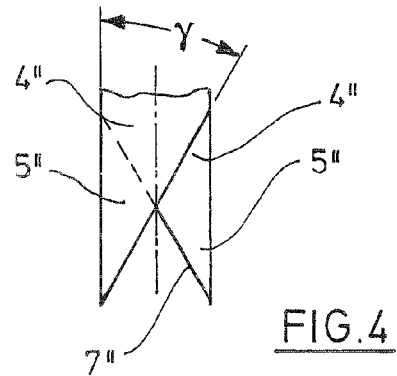
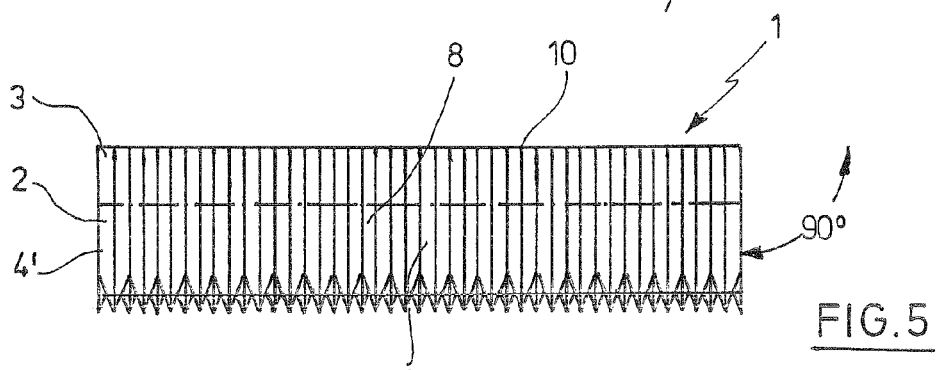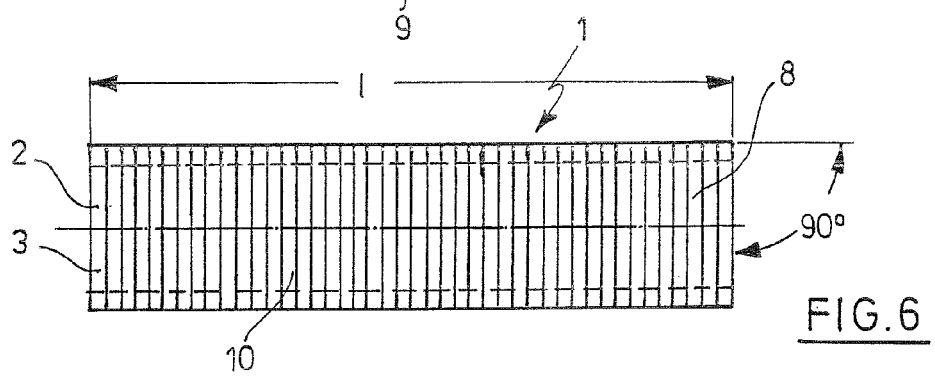

FASTENING CLIP BAR

BACKGROUND OF THE INVENTION

1. Field of the Invention

The present invention is related to a fastening clip bar, comprising a plurality of fastening clips arranged parallel to each other, and an adhesive joining the fastening clips with each other.

2. Description of the Related Art

Fastening clips are U-shaped fastening means with a back and two lateral legs. For instance, they are circular or flat wires bent into the shape of an U. In many cases, the ends of the legs are provided with a chamfered cut, so that the legs can penetrate into an underground more easily. By an asymmetric chamfered cut it can be obtained that the legs run sideways from the original leg axis when they are driven in, by which the resistance against pull-out can be increased.

Fastening clip bars can be produced by cutting single wires from a continuous wire material into length, then bending a plurality of single wires over a shaping body and collecting them, and subsequently gluing together a plurality of fastening clips to a fastening clip bar. This method has become known as "one wire" or "two wires" method. The adhesive is applied to the back of the fastening clips from the outside. Further, a method for producing fastening clip bars is known in which a tape material is provided, which comprises parallel wires aligned in the direction of travel of the tape material, the tape material is divided crosswise to the direction of travel, and the plates are bent to a fastening clip bar. A particularly advantageous realisation of this "plural wires" method is decried in EP 1 331 407 B1.

The fastening clip bars are placed by means of tackers, which may be manually operated, mechanically operated, hydraulically operated, gas-fired or electrically operated tackers. In a tacker, a fastening clip bar is thrust from a magazine into the movement region of a tacking plunger, which is driven in one of the ways described above. The tacking plunger shears offone or plural fastening clips at the same time and drives them through a drive-in channel of a muzzle head into a work piece, against which the tacker is set with the muzzle head.

Self-loading machines have a magazine, which accommodates a plurality of fastening clip bars in the parallel direction. A fastening clip bar is arranged in the supply path to the drive-in channel and is thrust in the direction of the drive-in channel by a spring-biased slide bar. After each drive-in procedure, the slide bar thrusts the rest of the fastening clip bar somewhat forward, until the fastening clip bar is used up. Then, the slide bar is pulled back, and a further fastening clip bar follows on into the supply path. In particular, self-loading machines can be realised as side-loading machines with fastening clip bars arranged laterally side by side or as vertically loading or rear loading machines with fastening clip bars arranged one above the other.

In many usages of self-loading machines, strong shocks are introduced into the magazine. These shocks may have the result that fastening clip bars break. By faulty alignments in the magazine, the broken fastening clip bars can disturb the further loading of fastening clip bars into the supply path and thus they can result in operation troubles.

By way of example, the above problem occurs when fastening clip bars are automatically driven into bedsteads made of wood. Automatic apparatuses are used for this, in which several tackers are arranged on one common support frame. The support frame is moved to and fro between an upper idle position, in which processed bedsteads can be replaced by bedsteads which are to be processed, and a working position, in which the tackers are set against the work pieces. In each movement to and fro, strong shocks act on the magazines. Further on, a strong shock is introduced into the magazine in each driving in procedure, because a piston driving the tacking plunger hits against a stop buffer after a long working stroke, and this causes a strong concussion of the whole tacker. As a result of the concussions, breach of fastening clips in the self-loading magazines often occurs.

BRIEF SUMMARY OF THE INVENTION

Starting from this, the present invention is based on the objective to provide a fastening clip bar whose usage in tackers with self-loading magazines causes fewer troubles in the operation.

The objective is resolved by a fastening clip bar with the features of the claim 1. Advantageous embodiments of the fastening clip bar are indicated in the subclaims.

The fastening clip bar according to the present invention has a plurality of fastening clips arranged parallel to each other, an adhesive joining the fastening clips with each other, and at least one elastic tape extending over the fastening clips which is glued together with the same.

The present invention starts from the surprising finding that it makes no sense to realise the fastening clip bar such that a breach of the fastening clip bar upon shock stresses in the self-loading magazine is avoided. Such realisations necessitate a sumptuous use of greater amounts of the adhesive, which can negatively affect the placement of the fastening clip bars. To the contrary, the fastening clip bar according to the present invention is purposefully designed such that that it can break under the shocks occurring in self-loading devices. For this purpose, the fastening clips of the fastening clip bar are connected with each other by an elastic tape, which permits the relative movement of parts of the fastening clip bar with respect to each other, which is necessary for a breach of the fastening clip bar. The tape compensates the relative movement through elastic deformation, and is therefore not destroyed in the breach of the fastening clip bar. Subsequently, the tape takes on its original form again and keeps the fragments of the fastening clip bar sufficiently together, so that the fastening clip bars can be recharged into the supply path without blocking the self-loading magazine. Shocks introduced into the self-loading magazine are absorbed by breaking fastening clip bars, so that the breach of further fastening clip bars or damages of the tacker, respectively, can be avoided, which contributes to the prevention of troubles in the operation.

Thus, the fastening clip bar can be advantageously processed by means of self-loading machines, but is not limited to this usage, however. In particular, processing by means of handheld devices and/or not self-loading tackers is also possible.

The adhesive joining the fastening clips can release solvents during the production and the subsequent storage of the fastening clip bar, which can deteriorate the elastic tape. According to an advantageous embodiment of the present invention, the tape is breathable and/or solvent resistant. A breathable tape permits the solvents to penetrate. A solvent resistant tape is not damaged by released solvents.

In principle, the tape can extend over an inner side of the fastening clips. In one embodiment, the tape extends over an outer side of the fastening clips. This is particularly advantageous from the standpoint of the manufacture.

In principle, it may be sufficient that the tape extends over a portion of the fastening clip bar which is particularly prone to breaking. This may be the central region of the fastening clip bar. According to a particularly preferred embodiment, the tape extends over the entire fastening clip bar and is joined with all the fastening clips of the fastening clip bar. Through this it is made sure that a breach of the fastening clip bar at an arbitrary position does not cause any loading jams.

The tape may extend over the legs of the fastening clips. According to an embodiment which is advantageous from the viewpoint of manufacture, the tape extends over the back of the fastening clips.

In principle, even the adhesive can be applied on the inner side of the fastening clips. According to an embodiment which is advantageous from the viewpoint of manufacture, the adhesive is applied to the outer side of the fastening clips.

Further, the present invention incorporates embodiments in which the adhesive is disposed on the legs of the fastening clips. According to an embodiment which is advantageous from the viewpoint of manufacture, the adhesive is applied on the back of the fastening clips.

Embodiments are also incorporated in which the tape and/or the adhesive is/are applied on the back as well as on the legs of the fastening clips.

The tape may be joined with the fastening clips in different ways. In one embodiment, the tape is connected to the fastening clips by means of the adhesive which joins the fastening clips with each other. For this purpose, the tape may be applied in the application and before the curing of the adhesive on the fastening clips. According to a further embodiment, which can be used in addition to or instead of the embodiment described above, the tape is glued together with the fastening clips or with the adhesive applied thereon, respectively, by means of an adhesive film on its lower side which is applied on the fastening clips with the tape. A self-adhesive tape is used in this, which can be applied before or after the curing of the adhesive.

According to a further embodiment, which can be used in addition to or instead of at least one of the embodiments described above, the tape is glued together with the fastening clips or with the adhesive applied thereon, respectively, by means of an adhesive set free from the tape. This embodiment uses the fact that the tape contains an adhesive which is set free in the application on the fastening clips and which produces the connection between tape and fastening clips. By way of example, the release of the adhesive can be caused by heating.

In particular, the fastening clips can be made from a metal or from a plastic material.

According to a further embodiment, a means for reducing the resistance against penetration and/or for gluing the legs to the underground is applied on the legs. The means facilitates the penetration of the legs into the underground and/or contributes to the anchoring of the fastening clips on the underground, so that the drive-in impacts exerted onto the fastening clips can be reduced. As a consequence, breaches of the fastening clip bar occur less frequently, and the risk of loading jams is reduced further.

In particular, the fastening clips can be made from a metal or from a plastic material.

According to a preferred embodiment, the fastening clips are made from a wire.

According to a further preferred embodiment, the legs have a chamfered cut on the ends, by which the impacts necessary for driving in can also be reduced.

The present invention is explained in more detail in the following by means of the attached drawings of an example of its realisation. In the drawings show:

BRIEF DESCRIPTION OF THE DRAWINGS

FIG. 1 a fastening clip bar in an enlarged side view;
FIG. 2 the same fastening clip bar in an enlarged cross section along the line A-A of FIG. 1;
FIG. 3 an enlarged detail X of FIG. 1;
FIG. 4 an alternative realisation Y of the detail X of FIG. 1;
FIG. 5 the same fastening clip bar in a side view;
FIG. 6 the same fastening clip bar in the top view.

DETAILED DESCRIPTION OF THE INVENTION

According to FIGS. 1, 5 and 6, a fastening clip bar 1 consists of a plurality of fastening clips 2. Each fastening clip 2 has a back 3 with two legs 4', 4" projecting parallel from it and being essentially straight. In the example, the back 3 has a bending radius r, in the view of a specific usage. In the context of other usages, the back 3 can also be executed otherwise, in a straight line in particular.

According to FIG. 2, each fastening clip is bent from a flat wire.

According to FIG. 3, the legs 4', 4" each have a chisel made chamfered cut 6', 6" on their free ends, which is symmetrical and has a chisel angle β.

According to FIG. 4, the legs 4', 4" have a lateral chamfered cut 7', 7" with an angle γ on each of their free ends 5', 5', wherein the chamfered cuts of neighbouring legs 4', 4" of neighbouring fastening clips 2 are chamfered in different directions.

According to FIGS. 5 and 6, the fastening clips 2 of the fastening clip bar 1 are coated with an adhesive 8 on the back 3 and in the upper region of the legs 4', 4" at the outside. The same is for instance an adhesive which is cured by heating after the application. In the example, the legs 4', 4" are coated with adhesive 8 for about ⅓ of their height, up to the stroke-dotted line.

Further, the legs 4', 4" are each one provided with a lacquer 9 in the lower region at the outer and the inner side, which reduces the resistance against penetration and/or increases the resistance against being pulled out and anchors the legs, when the fastening clips 2 are already driven into the wood. In the example, the legs 4', 4" are coated with the lacquer 9 for about ⅔ of their height.

The fastening clip bar 1 can be manufactured by the one wire, two wires or plural wires method mentioned in the beginning.

Finally, an elastic tape 10 is disposed on the outside on the back 3 and on the part of the legs 4', 4"—up to the stroke-dotted line—of the fastening clip bar 1, which is breathable and/or solvent free in particular.

The elastic tape 10 permits a breach of the fastening clip bar 1 and keeps the fastening clips 2 sufficiently together, so that no loading jam takes place in the self-loading magazine. The elastic tape 10 can be executed to be breathable and solvent resistant. This is preferably the case when a solvent-containing adhesive is used. Then, the elastic tape 10 permits permeation of solvent set free by the adhesive and is not affected by the same.

The tape 10 is attached to the fastening clip bar 1 after the application and before the curing of the adhesive. Adhesive 8 and the tape 10 are matched such that the tape 10 adheres on the fastening clips 2 in the curing of the adhesive 8.

When driving in, the part of the tape 10 adhering on the driven in fastening clip 2 is sheared off from the fastening clip bar 1 with the fastening clip 2 and remains on the fastening clip 2.

The invention claimed is:

1. A fastening clip bar, comprising a plurality of fastening clips (2) arranged parallel to each other, each clip having a back (3) and legs (4', 4") an adhesive (8) joining the fastening clips with each other at the backs and at least part of the legs, and at least one elastic tape (10) extending over the fastening clips (2), wherein the elastic tape (10) is glued together with the fastening clips (2) while said adhesive is still uncured and wherein the elastic tape (10) keeps the clips of the fastening clip bar together in case of breach of the fastening clip bar.

2. A fastening clip bar according to claim 1, wherein the tape (10) is breathable and/or solvent resistant.

3. A fastening clip bar according to claim 1, said clip back having an outer and a lower side, wherein the tape (10) extends over an outer side of the fastening clips.

4. A fastening clip bar according to claim 1, wherein the tape (10) extends over the back (3) of the fastening clips.

5. A fastening clip bar according to claim 1, wherein the adhesive (8) is applied on the backs of the fastening clips.

6. A fastening clip bar according to claim 1, wherein the adhesive (8) is applied on at least a part of the legs (4', 4") of the fastening clips (2).

7. A fastening clip bar according to claim 1, wherein the adhesive is applied on an outer side of the fastening clips (2).

8. A fastening clip bar according to claim 1, said clip back having an outer and a lower side, wherein the tape (10) is glued together with the fastening clips (2) by adhesive (8) which keeps the fastening clips (2) together.

9. A fastening clip bar according to claim 1, wherein a lacquer for reducing the resistance against penetration and/or for gluing the legs to the underground is applied on the legs (4', 4").

10. A fastening clip bar according to claim 1, wherein the fastening clips (2) are made of a wire.

11. A fastening clip bar according to claim 1, wherein the legs (4', 4") have a chamfered cut (6, 7) on the ends.

12. A fastening clip bar according to claim 1 wherein said tape extends over the legs of the fastening clips.

13. A fastening clip bar according to claim 1, wherein the tape (10) is glued together with the fastening clips by adhesive (8) which keeps the fastening clips together.

14. A fastening clip bar according to claim 1, said clip back having an outer and a lower side, wherein the tape (10) is glued together with the fastening clips by adhesive (8) which keeps the fastening clips together and by an adhesive film at its lower side which is applied on the fastening clips with the tape.

15. A fastening clip bar according to claim 1, said clip back having an outer and a lower side, wherein the tape (10) is glued together with the fastening clips by an adhesive film at its lower side which is applied on the fastening clips with the tape.

16. A fastening clip bar according to claim 1, said clip back having an outer and a lower side, wherein the tape (10) is glued together with the fastening clips by an adhesive which is released from the tape (10).

17. A fastening clip bar according to claim 1, wherein said legs include a lacquer coating to increase their holding once driven.

18. A fastening clip bar according to claim 1, wherein said legs include a lacquer coating for reducing the resistance against penetration.

19. The fastening clip of claim 8 further including an adhesive film at the lower side of the tape which is applied on the fastening clips (2) with the tape.

20. The fastening clip of claim 8 further including an adhesive which is set free from the tape (10).

21. A fastening clip bar, comprising a plurality of fastening clips (2) arranged parallel to each other, each clip having a back (3) and legs (4', 4") a first adhesive (8) joining the fastening clips with each other at the backs and at least apart of the legs, and at least one elastic tape (10) extending over the fastening clips (2), wherein the elastic tape (10) is glued with a second adhesive to the fastening clips (2), to said first adhesive or said fastening clips and said first adhesive, and wherein the elastic tape (10) keeps the clips of the fastening clip bar together in case of breach of the fastening clip bar.

* * * * *